United States Patent [19]

Todo et al.

[11] Patent Number: 4,943,611

[45] Date of Patent: Jul. 24, 1990

[54] RESIN COMPOSITION FOR SPACERS OF INFORMATION RECORDING DISC

[75] Inventors: Akira Todo; Toshio Kimura; Takeshi Minoda; Masayoshi Kurisu, all of Ichihara, Japan

[73] Assignee: Mitsui Petrochemical Industries, Ltd., Tokyo, Japan

[21] Appl. No.: 224,685

[22] Filed: Jul. 27, 1988

[30] Foreign Application Priority Data

Jul. 27, 1987 [JP] Japan ................................ 62-187250

[51] Int. Cl.$^5$ ....................... C08G 59/50; C08G 59/22
[52] U.S. Cl. .................................. 524/493; 524/497; 524/553; 524/551; 523/174; 430/18; 428/66; 346/135.1
[58] Field of Search ................. 526/281; 524/553, 493, 524/497, 551

[56] References Cited

U.S. PATENT DOCUMENTS 4,720,715  1/1988  Ōmae ................................... 526/281

FOREIGN PATENT DOCUMENTS

| 0203799 | 12/1986 | European Pat. Off. ............ 526/281 |
| 61-115916 | 6/1986 | Japan ................................ 526/281 |
| 61-211315 | 9/1986 | Japan ................................ 526/281 |
| 61-292601 | 12/1986 | Japan ................................ 526/281 |
| 62-215611 | 9/1987 | Japan ................................ 526/281 |

*Primary Examiner*—C. Warren Ivy
*Attorney, Agent, or Firm*—Sherman & Shalloway

[57] ABSTRACT

A resin composition for spacers of an information recording disc which comprises: (A) a random copolymer of ethylene and at least one cycloolefin having an intrinsic viscosity [$\eta$] of from 0.05 to 10 dl/g, as measured in decalin at a temperature of 135° C., and (B) from 0.01 to 5 parts by weight, based on 100 parts by weight, of said copolymer A, of an inorganic particles such as titania and silica having a particle size of not more than 300 $\mu$m. Spacers made of the composition described herein can be welded to disc substrates within a shortened period of ultrasonic vibration to produce an information recording disc having a reduced warp angle.

3 Claims, 2 Drawing Sheets

RESIN COMPOSITION FOR SPACERS OF INFORMATION RECORDING DISC

FIELD OF THE INVENTION

The present invention relates to a resin composition for spacers of an information recording disc of air-sandwich structure, such as an optical disc. More particularly, it related to a resin composition suitable for use as a material of spacers with which an information recording disc of an air-sandwich structure is manufactured by an ultrasonic welding process.

BACKGROUND OF THE INVENTION

Known in the art is an information recording disc of an air-sandwich structure in which two disc substrates each having a recording medium-containing layers are arranged so that said layers face to each other with a spaced therebetween by means of outer and inner peripheral spacers, said substrates and spacers being welded together by an ultrasonic welding technique (Japense Patent Laid-open Publication No. 60-103,537).

As materials of the disc substrates of the above-mentioned information recording disc use has been made of polymethyl methacrylate, polycarbonate, polystyrene, rigid polyvinyl chloride, epoxy resins and glass. In place of such materials Japanese Patent application No. 62-15,218 proposes copolymers of ethylene with at least one cycloolefin which copolymers are more suitable for being processed by the ultrasonic welding technique.

The proposed copolymers are excellent in heat resistance, low moisture absorption, chemical resistance, precision moldability, and adhesion to the recording medium-containing layer. In order to successfully carry out the ultrasonic welding it is necessary to improve the weldability between the substrates and spacers and to reduce residual strain due to welding thereby avoiding any birefringence. For this reason spacers made of the same kind of resin have been used. Since the disc substrates are required to be transparent, those made of a transparent resin with no inorganic filters have been use, and in turn spacers made of the same transparent resin with no inorganic fillers have been used.

However, there has been a problem in that when disc substrates, and outer and inner peripheral spacers made of the transparent copolymer with no inorganic fillers added are welded by the ultrasonic welding technique to produce an optical disc, a relatively long period for time of ultrasonic vibration is required and the optical disc so produced frequently exhibits a warp of an intolerably large angle.

OBJECT OF THE INVENTION

The invention is intended to solve the above discussed problem associated with the prior art, and an object of the invention is to provide a resin composition for spacers of an information recording disc, the spacers made of the composition according to the invention capable of being welded to disc substrates within a shortened period of ultrasonic vibration to produce the information recording disc having a reduced warp angle.

SUMMARY OF THE INVENTION

A resin composition for spacers of an information recording disc according to the invention comprises:
(A) a random copolymer of ethylene and at least one cycloolefin represented by the general formula [I] or [II] shown below and having an intrinsic viscosity $[\eta]$ of from 0.05 to 10 dl/g, as measured in decalin at a temperature of 135° C., and
(B) from 0.01 to 5 parts by weight, based on 100 parts by weight of said copolymer (A), of at least one inorganic material selected from the group consisting of titanium oxide and silica having a particle size of not more than 300 μm.

General formulas:

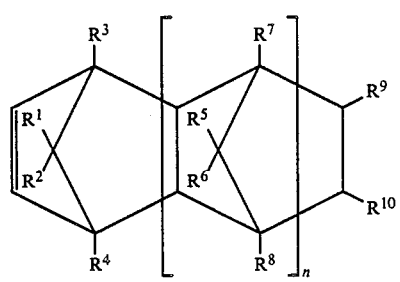

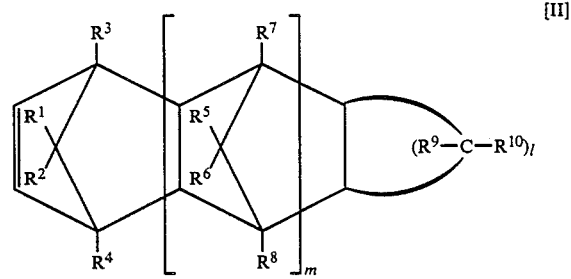

t,0050
wherein n and m each represents 0 or a positive integer, l is an integer of at least 3, and $R^1$ to $R^{10}$ independently represent a hydrogen atom, a halogen atom or a hydrocarbon group.

DETAILED DESCRIPTION OF THE INVENTION

The random copolymer A comprises as essential polymer constituent components first constituent unit derived from ethylene and second constituent unit derived from at least one cycloolefin of the general formula [I] or [II] shown above. When these cycloolefins are copolymerized with ethylene they form units of the following general formula [III] or [IV] in the resultant copolymer, respectively.

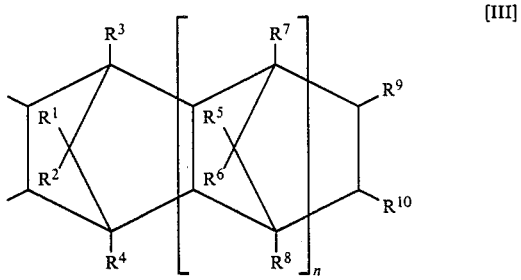

-continued

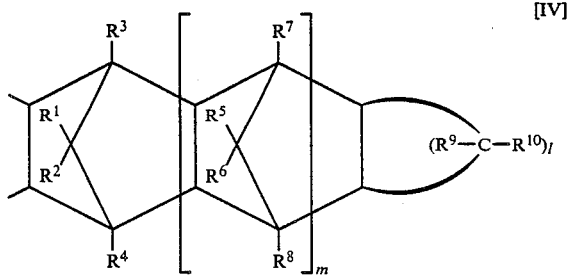

[IV]

wherein n, m, l and $R^1$ to $R^{10}$ are as defined above.

The cycloolefins of the general formula [I] can be readily prepared by Diels-Alder condensation of a cyclopentadiene compound with an appropriate olefin. Likewise, the cycloolefins of the general formula [II] can be easily prepared by Diels-Alder condensation of a cyclopentadiene compound with an appropriate cycloolefin.

Typical of the cycloolefins of the general formula [I] are such compounds as listed in Tables 1 and 2, and octahydronaphthalenes such as 1,4,5,8-dimethano-1,2,3,4,4a,5,8,8a-octahydronaphthalene, 2-methyl-1,4,5,8-dimethano-1,2,3,4,4a,5,8,8a-octahydronaphthalene, 2-ethyl-1,4,5,8-dimethano-1,2,3,4,4a,5,8,8a-octahydronaphthalene, 2-propyl-1,4,5,8-dimethano-1,2,3,4,4a,5,8,8a-octahydronaphthalene, 2-hexyl-1,4,5,8-dimethano-1,2,3,4,4a,5,8,8a-octahydronaphthalene, 2,3-dimethyl-1,4,5,8-dimethano-1,2,3,4,4a,5,8,8a-octahydronaphthalene, 2-methyl-3-ethyl-1,4,5,8-dimethano-1,2,3,4,4a,5,8,8a-octahydronaphthalene, 2-chloro-1,4,5,8-dimethano-1,2,3,4,4a,5,8,8a-octahydronaphthalene, 2-bromo-1,4,5,8-dimethano-1,2,3,4,4a,5,8,8a-octahydronaphthalene, 2-fluoro-1,4,5,8-dimethano-1,2,3,4,4a,8,8a-octahydronaphthalene, 2,3-dichloro-1,4,5,8-dimethano-1,2,3,4,4a,5,8,8a-octahydronaphthalene, 2-cyclohexyl-1,4,5,8-dimethano-1,2,3,4,4a,5,8,8a-octahydronaphthalene, 2-n-butyl-1,4,5,8-dimethano-1,2,3,4,4a,5,8,8a-octahydronaphthalene, and 2-isobutyl-1,4,5,8-dimethano-1,2,3,4,4a,5,8,8a-octahydronaphthalene.

Typical of the cycloolefins of the general formula [II] are such compounds as listed in Tables 3 and 4.

These cycloolefins of the general formula of [I] or [II] can be used alone or in combination in copolymerization with ethylene to prepare the random copolymer A.

TABLE 1

| Chemical formula | Compound name |
|---|---|
| | Bicyclo[2,2,1]hept-2-ene |
| | 6-Methylbicyclo[2,2,1]hept-2-ene |
| | 5,6-Dimethylbicyclo[2,2,1]hept-2-ene |
| | 1-Methylbicyclo[2,2,1]hept-2-ene |
| | 6-Ethylbicyclo[2,2,1]hept-2-ene |
| | 6-n-Butylbicyclo[2,2,1]hept-2-ene |
| | 6-Isobutylbicyclo[2,2,1]hept-2-ene |
| | 7-Methylbicyclo[2,2,1]hept-2-ene |

TABLE 2

| Chemical formula | Compound name |
|---|---|
| | 5,10-Dimethyltetracyclo-[4,4,0,1$^{2.5}$,1$^{7.10}$]-3-dodecene |
| | 2,10-Dimethyltetracyclo-[4,4,0,1$^{2.5}$,1$^{7.10}$]-3-dodecene |
| | 11,12-Dimethyltetracyclo-[4,4,0,1$^{2.5}$,1$^{7.10}$]-3-dodecene |

TABLE 2-continued

| Chemical formula | Compound name |
|---|---|
| 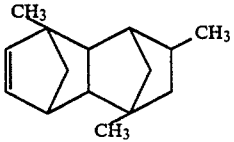 | 2,7,9-Trimethyltetracyclo-[4,4,0,1$^{2.5}$,1$^{7.10}$]-3-dodecene |
| 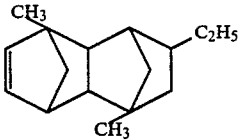 | 9-Ethyl-2,7-dimethytetracyclo-[4,4,0,1$^{2.5}$,1$^{7.10}$]-3-dodecene |
| 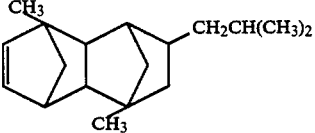 | 9-Isobutyl-2,7-dimethyltetracyclo-[4,4,0,1$^{2.5}$,1$^{7.10}$]-3-dodecene |
| 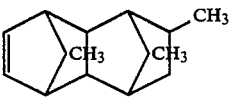 | 9,11,12-trimethyltetracyclo-[4,4,0,1$^{2.5}$,1$^{7.10}$]-3-dodecene |
| 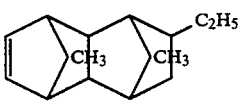 | 9-Ethyl-11,12-dimethyltetracyclo-[4,4,0,1$^{2.5}$,1$^{7.10}$]-3-dodecene |
| 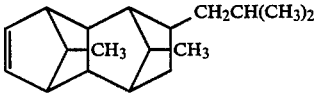 | 9-Isobutyl-11,12-dimethyltetra-cyclo[4,4,0,1$^{2.5}$,1$^{7.10}$]-3-dodecene |
| 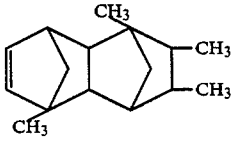 | 5,8,9,10-Tetramethyltetracyclo-[4,4,0,1$^{2.5}$,1$^{7.10}$]-3-dodecene |
| 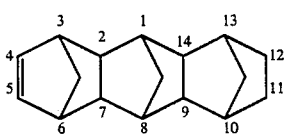 | Hexacyclo[6,6,1,1$^{3.6}$,1$^{10.13}$,0$^{2.7}$,0$^{9.14}$]-4-heptadecene |
|  | 12-Methylhexacyclo[6,6,1,1$^{3.6}$,1$^{10.13}$,0$^{2.7}$,0$^{9.14}$]-4-heptadecene |
| 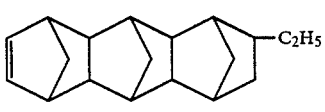 | 12-Ethylhexacyclo[6,6,1,1$^{3.6}$,1$^{10.13}$,0$^{2.7}$,0$^{9.14}$]-4-heptadecene |
| 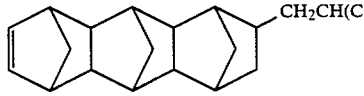 | 12-Isobutylhexacyclo[6,6,1,1$^{3.6}$,1$^{10.13}$,0$^{2.7}$,0$^{9.14}$]-4-heptadecene |
| 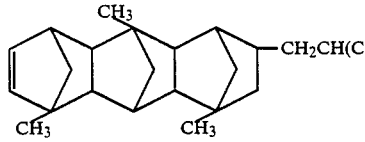 | 1,6,10-Trimethyl-12-isobutyl-hexacyclo[6,6,1,1$^{3.6}$,1$^{10.13}$,0$^{2.7}$,0$^{9.14}$]-4-heptadecene |

TABLE 2-continued

| Chemical formula | Compound name |
| --- | --- |
| | Octacyclo[8,8,0,1$^{2.9}$,1$^{4.7}$,1$^{11.18}$,1$^{13.16}$,0$^{3.8}$,0$^{12.17}$]-5-docosene |
| | 15-Methyloctacyclo[8,8,0,1$^{2.9}$,1$^{4.7}$,1$^{11.18}$,1$^{13.16}$,0$^{3.8}$,0$^{12.17}$]-5-docosene |
| | 15-Ethyloctacyclo[8,8,0,1$^{2.9}$,1$^{4.7}$,1$^{11.18}$,1$^{13.16}$,0$^{3.8}$,0$^{12.17}$]-5-docosene |

TABLE 3

| Chemical formula | Compound name |
| --- | --- |
| | 1,3-Dimethylpentacyclo[6,6,1,1$^{3.6}$,0$^{2.7}$,0$^{9.14}$]-4-hexadecene |
| | 1,6-Dimethylpentacyclo[6,6,1,1$^{3.6}$,0$^{2.7}$,0$^{9.14}$]-4-hexadecene |
| | 15,16-Dimethylpentacyclo[6,6,1,1$^{3.6}$,0$^{2.7}$,0$^{9.14}$]-4-hexadecene |
| | Pentacyclo[6,5,1,1$^{3.6}$,0$^{2.7}$,0$^{9.13}$]-4-pentadecene |
| | 1,3-Dimethylpentacyclo[6,5,1,1$^{3.6}$,0$^{2.7}$,0$^{9.13}$]-4-pentadecene |
| | 1,6-Dimethylpentacyclo[6,5,1,1$^{3.6}$,0$^{2.7}$,0$^{9.13}$]-4-pentadecene |
| | 14,15-Dimethylpentacyclo[6,5,1,1$^{3.6}$,0$^{2.7}$,0$^{9.13}$]-4-pentadecene |
| | Pentacyclo[6,6,1,1$^{3.6}$,0$^{2.7}$,0$^{9.14}$]-4-hexadecene |

TABLE 3-continued

| Chemical formula | Compound name |
|---|---|
| (structure) | Heptacyclo[8,7,0,1$^{2.9}$,1$^{4.7}$,1$^{11.17}$, 0$^{3.8}$,0$^{12.16}$]-5-eicosene |
| (structure) | Heptacyclo[8,8,0,1$^{2.9}$,1$^{4.7}$,1$^{11.18}$, 0$^{3.8}$,0$^{12.17}$]-5-heneicosene |

TABLE 4

| Chemical formula | Compound name |
|---|---|
| (structure) | Tricyclo[4,3,0,1$^{2.5}$]-3-decene |
| (structure with CH$_3$) | 2-Methyl-tricyclo[4,3,0,1$^{2.5}$]-3-decene |
| (structure with CH$_3$) | 5-Methyl-tricyclo[4,3,0,1$^{2.5}$]-3-decene |
| (structure) | Tricyclo[4,4,0,1$^{2.5}$]-3-undecene |
| (structure with CH$_3$) | 10-Methyl-tricyclo[4,4,0,1$^{2.5}$]-3-undecene |

As described hereinbefore, the copolymer A comprises as essential polymer constituent components first constituent unit derived from ethylene and second constituent unit derived from at least one cycloolefin of the general formula [I] or [II] arranged at random. In addition to these two essential components, however, it may further comprise, if desired, third constituent unit derived from at least one other copolymerization monomer so far as the third constituent unit does not hinder the object of the invention. Such optional third constituent unit of the copolymer A may be derived from as alpha-olefin having from 3 to 20 carbon atoms such as propylene, 1-butene, 4-methyl-1-pentene, 1-hexene, 1-octene, 1-decene, 1-dodecene, 1-tetradecene, 1-hexadecene, 1-octadecene and 1-eicocene in an amount of up to an equimolar amount of the ethylene forming the first constituent units of the copolymer.

In the copolymer A, the first constituent unit derived from ethylene is present normally within the range of from 40 to 95 mole %, preferably from 50 to 85 mole %, more preferably from 55 to 80 mole %, while the second constituent unit of the general formula [III] or [IV] is present normally within the range of from 5 to 60 mole %, preferably from 15 to 50 mole %, more preferably from 20 to 45 mole %. The first and second constituent units are arranged at random to form a substantially linear polymer chain. The copolymer A is completely soluble in decalin at a temperature of 135° C., revealing the fact that it is substantially linear and does not have a gel-forming cross-linked structure.

The copolymer A has an intrinsic viscosity [η] of from 0.05 to 10 dl/g., preferably from 0.3 to 3 dl/g, as measured in decalin at a temperature of 135° C., Further, the copolymer A preferably has a softening temperature (TMA) of, normally from 170° to 170° C., preferably from 80° to 130° C., as measured by means of a thermal mechanical analyzer, a glass transition temperature (Tg) of, normally from 50° to 160° C., preferably from 70° to 120° C., and a crystallinity of, normally not higther than 10%, preferably not more than 7%, and more preferably not more than 5%, as determined by X-ray diffractometry.

Furthermore, the base resin for spacers according to the present invention may include in addition to the copolymer A a copolymer B which is the same to the copolymer A except that it has a softening temperature (TMA) of less than 70° C.

The weight ratio of the copolymer A to the copolymer B is preferably from 100/0.1 to 100/10.

A polymeric components of the resin composition according to the invention may consist of the copolymer A having the above-mentioned properties. However, a part of the copolymer A may be replaced with a copolymer which does not fully satisfy such properties so far as the resin composition as a whole has the above-mentioned properties.

The copolymer A having the above-mentioned properties can be prepared by suitably selecting the conditions under which it is prepared in accordance with the processes proposed by the assignee of the present application in Japanese Patent Laid-open Publication Nos. 60-168,708, 61-120,816, 61-115,912 61-115,916 and 61-271,308 and Japenese Patent Application Nos. 61-95,905 and 61-95,906.

The resin composition according to the invention comprises the copolymer A and 0.01 to 5 parts, preferably from 0.05 to 1 part, by weight, based on 100 parts by weight of the copolymer A, of an inorganic particle. Any inorganic fillers generally used in plastic compositions, including, for example, titanium oxide, silica, alumina, talc and calcium carbonate, alone or in combination, can be used in the resin composition according to the invention. Of these, titanium oxide and silica are particularly preferred. The particle size of the inorganic particle is not more than 300 μm, and preferably not more than 200 μm.

In addition to the above-mentioned essential two components A and B, the present composition may be incorporated with heat stabilizers, weathering stabilizers, antistatic agents, slipping agents, anti-blocking agents, anti-fogging agents, lubricants, dyes, pigments, natural oil, synthetic oil, wax, and amounts of these additives may be suitably decided. For instance, the stabilizers which may be optionally incorporated include phenolic antioxidants such as tetrakis [methylene-3-(3,5-di-t-butyl-4-hydroxyphenyl)propionate] methane,β-(3,5-di-t-butyl-4-hydroxyphenyl)propionic acid alkyl ester (particularly preferred are alkyl ester of less than 18 carbon atoms), 2,2'-oxamidobis[ethyl-3-(3,5-di-t-butyl-4-hydroxyphenyl)]propionate, metallic salts of fatty acid such as zinc stearate, calcium stearate, and calcium 12-hydroxystearate, and fatty esters of polyhydric alcohol such as glycerin monostearate, glycerin monolaurate, glycerin distearate, pentaerythritol distearate and pentaerythritol tristearate. These compounds may be incorporated into the present composition either singly or in combination. For instance, there may be used such a combination of tetrakis[methylene-3-(3,5-di-t-butyl-4-hydroxyphenyl)propionate]methane with zinc stearate and glycerin monostearate.

The phenolic antioxidants as illustrated above are used in an amount of 0.01-10 parts by weight, preferably 0.05-3 parts by weight based on 100 parts by weight of the random copolymer A. Similarly, the fatty esters of polyhydric alcohol are used in an amount of 0.01-10 parts by weight, preferably 0.05-3 parts by weight based on 100 parts by weight of the copolymer A.

The resin composition according to the invention can be prepared by blending the components A and B, and optionally added other components by known methods, for example, by blending them in an extruder.

The resin composition according to the invention is used as a material in the production of spacers of an information recording disc of an air-sandwich structure. The information recording disc may be assembled by laminating two disc substrates, at least one of which has a recording medium-containing layer, so that the recording medium containing layer of said disc faces inwardly with the outer and inner peripheral spacers therebetween, and welding the substrates and spacers together by an ultrasonic welding technique. While the resin composition according to the invention can be used as a material for one or both outer and inner peripheral spacers, it is particularly suitable for use as a material for the outer peripheral spacer. The disc substrates are preferably made of the random copolymer A with no inorganic particles B, in particular, having a softening temperature of at least 100° C.

A preferred process for the production of an information recording disc, in which spacers made of the resin composition according to the invention will now be described with reference to the attached drawings, in which.

Figure 1:
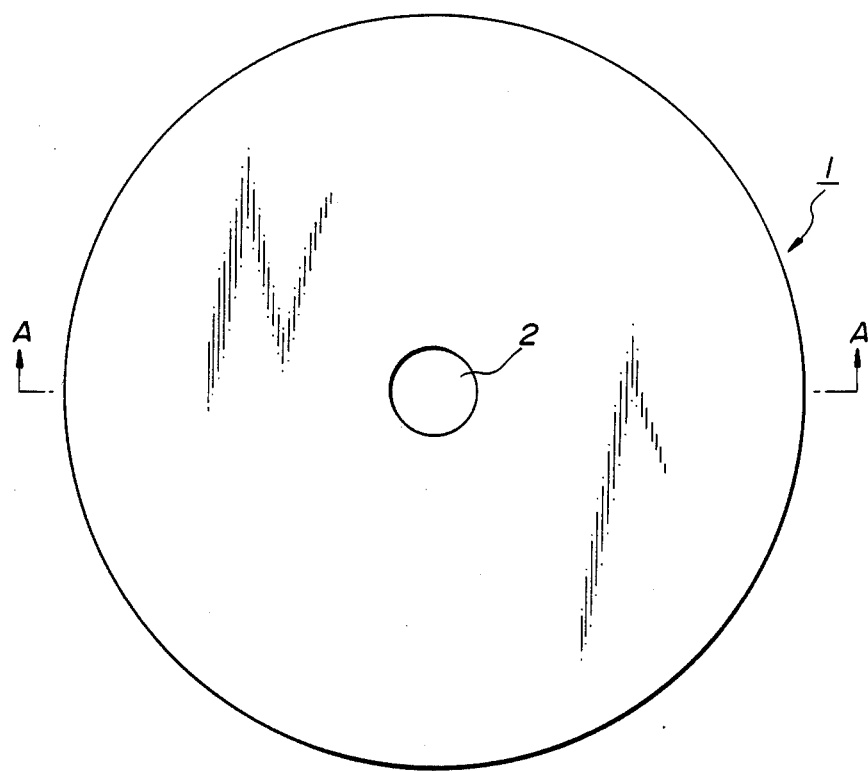
FIG. 1 is a plan view of an information recording disc produced.
Figure 2:
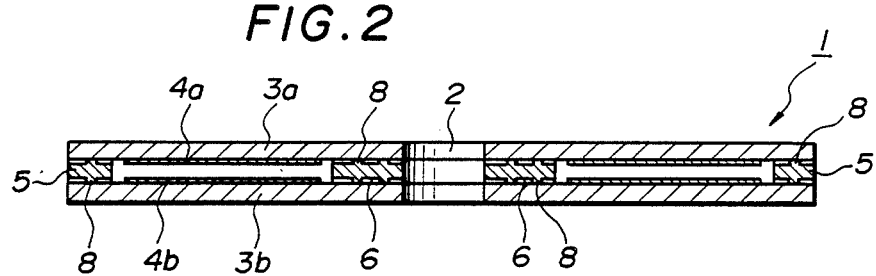
FIG. 2 is a cross-sectional view of the disc taken along the line A—A of FIG. 1.

Referring to FIGS. 1 and 2, an annular information recording disc 1 having a central aperture 2 comprises two annular disc substrates 3a and 3b, each having a recording medium-containing layer 4a and 4b, jointed together via an outer peripheral spacer 5 and an inner peripheral spacer 6 so that the recording medium-containing layers 4a and 4b face to each other, and melt welded together by ultrasonic welding technique at projections 7 provided on both surfaces of said outer and inner peripheral spacers 5 and 6, said projections 7 being transformed into melt adhesive portions 8 at the time when the ultrasonic welding is done. The disc substrates 3a and 3b are molded from the random copolymer A described herein.

Figure 3:
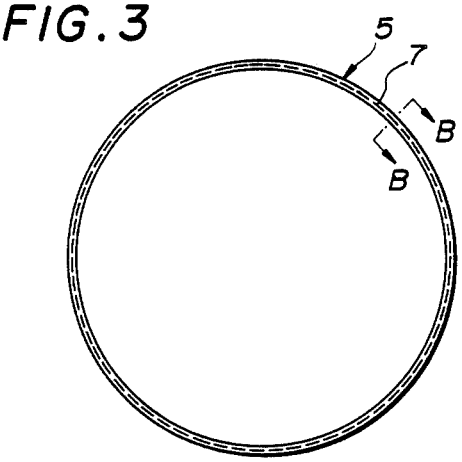
FIG. 3 is a plan view of an outer peripheral spacer.

The outer peripheral spacer 5 is molded into the form of ring and provided with tapering projections 7 on both surface and in the same position thereof. In FIG. 3, they are formed into short arcs arranged in the form of circular broken line, in FIG. 4 they are molded into long arcs arranged in the form of circle but divided into four positions along the circumference.

Figure 6:
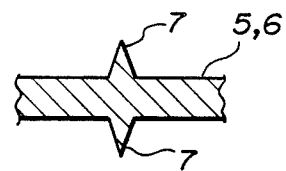
FIG. 6 is a cross-section along line the B—B of FIGS. 3 to 6.

The inner spacer 6 is molded into the form of disc having a center hole 2 at the center thereof and provided with tapering projections 7 on both surface and in the same position thereof. The projections 7 are arranged annularly but discontinuously, and in FIG. 6 they are molded into the form of cone and arranged in the form of radial dot in two rows.

While the outer peripheral spacer 5 is preferably molded form the resin composition according to the invention, it may be molded from the copolymer A having no inorganic particles B added thereto.

In the process for producing the above-mentioned information recording disc 1 of the present invention, the outer peripheral spacer 5 is first set on an anvil (a setting stand) of an ultrasonic welding machine (not shown) by inserting the projections 7 of the outer peripheral spacer 5 into a positioning groove of the anvil.

Under such conditions as illustrated above, a horn connected to an ultrasonic wave oscillater is allowed to descend by the action of a fluid pressure cylinder (not shown) onto the disc substrate 3a and thereby to apply ultarsonic wave vibration thereto under pressure, whereupon the projections 7 of the upper side of the outer peripheral spacer 5 and the portions of the disc substrate 3a corresponding thereto are soften and welded to each other, thereby forming a welded portion 8 as shown in FIG. 2.

Subsequently, the disc substrate 3a to which the outer peripheral spacer 5 has been welded in turn inside out on the anvil and thereon is superposed the other disc substrate 3b through the inner spacer 6. The thus constructed assembly is again subjected to ultrasonic vibration under pressure by means of the horn, whereby unwelded projections 7 of the outer peripheral spacer 5 and the inner peripheral spacer 6 and the corresponding portions of both the disc substrates 3a and 3b soften and weld together at once to form the melt adhesive portions 8. Thus, the information recording disc 1 is produced.

EFFECT OF THE INVENTION

Spacers made of the resin composition according to the invention comprising: (A) a random copolymer of ethylene and at least one cycloolefin and (B) from 0.01 to 5 parts by weight, based on 100 parts by weight, of said copolymer A, of an inorganic particles such as titania and silica, can be welded to disc substrates within a shortened period of ultrasonic vibration to produce an information recording disc having a reduced warp angle.

The invention will be further described by the following examples.

PREPARATION OF COPOLYMER A

With a 2-liter glass polymerization reactor equipped with a stirring blade, there was carried out continuously a copolymerization reaction between ethylene and 1,4,5,8-dimethano-1,2,3,4,4a,5,8,8a-octahydronaphthalene (structural formula:

hereinafter abbreviated to tetracyclododecene). That is, into the polymerization reactor were continuously charged a cyclohexane solution of tetracyclododecene so that the tetracyclododecene concentration in the polymerization reactor become 60 g/l, a cyclohexane solution of $VO(OC_2H_5)Cl_2$ as a catalyst so that the vanadium concentration in the polymerization reactor became 0.7 mmol/l, and a cyclohexane solution of ethylalumium sesquichloride ($Al(C_2H_5)_{1.5}Cl_{1.5}$) so that the aluminum concentration in the polymerization reactor became 5.6 mmol/l, while continuously withdrawing from the bottom of the polymerization reactor the polymerization liquid so that the volume of the polymerization liquid in the polymerization reactor constantly become 1 liter. Simultaneously, into the polymerization reactor from the top of the polymerization reactor ethylene was fed at a rate of 95 l/hr, hydrogen was fed at a rate of 6 l/hr and nitrogen was fed at a rate of 45 l/hr. The copolymerization reaction was carried out at 10° C. by circulating a refrigerant through a jacket fitted externally to the polymerization reactor.

The copolymerization was carried out under the conditions as illustrated above, whereupon a polymerization reaction mixture containing an ethylene tetracyclododecene random copolymer was obtained. The polymerization reaction was stopped by adding a small amount of isopropyl alcohol to the polymerization liquid withdrawn from the bottom of the reactor. Thereafter, an aqueous solution composed of 1 l of water and 5 ml of concentrated hydrochloric acid and the polymer solution were contacted at a ratio of 1:1 with strong stirring by a homomixer to transfer the catalyst residue to the aqueous layer. The mixture was left to stand, and the water layer was removed. The residue was washed twice with distilled water to purify and separate the polymer solution. Thereafter, the polymerization liquid was poured into a household mixer containing acetone of about three times the volume of the polymerization liquid, while rotating the mixer, thereby depositing the resulting copolymer. The deposited copolymer was collected by filtration, dispersed in acetone so that the polymer concentration becomes about 50 g/l, and the copolymer was treated at the boiling point of acetone. After the treatment as above, the copolymer was collected by filtration and dried at 100° C. overnight under reduced pressure.

The thus obtained ethylene tetracyclododecene random copolymer A has an ethylene unit of 68 mol % as measured by $^{13}C$-NMR analysis, an intrinsic viscosity $[\eta]$ of 0.51 dl/g as measured at 135° C. in decalin, and a softening temperature (TMA) of 125° C.

PREPARATION OF INFORMATION RECORDING DISCS AND TESTS

The information recording discs 1 were produced according to the above-mentioned processes by using the disc substrates 3a and 3b, 130 mm in diameter and 1.2 mm in thickness, molded from an ethylene/tetracyclododecene copolymer (the ethylene content 62 mol %), the outer peripheral spacers 5 respectively shown in FIG. 3, 130 mm in outside diameter, 125 mm in inside diameter, and about 0.4 mm in thickness but excluding a thickness of the projections 7, molded from a resin composition comprising an ethylene/tetracyclododecene (the ethylene content 68 mol %) incorporated with 0.1% by weight of titanium oxide having a particle size of 5 μm and the inner peripheral spacers 5, 36 mm in outside diameter, 15 mm in inside diameter, and about 0.4 mm in thickness but excluding a thickness of the projections 7, molded from an ethylene/tetracyclododecene copolymer (the ethylene content 68 mol %). The disc 1 thus produced were measured for amount of warp (W) (the maximum value of warp angle of the disc substrated 3a+the maximum value of angle of warp of the disc substrate 3b)/2. The results obtained are shown in Table 1.

In Table 1, the amount of warp was expressed in terms of the following indices of evaluation. In this connection, the information recording discs which can be put to practicai use without marring their performance are those having the evaluation indices F and G.

A: W>10 m radian
B: 10≧W>8.75 m radian
C: 8.75≧W>6.25 m radian
D: 7.5≧W>6.25 m radian
E: 6.25≧W>5 m radian
F: 5≧W>3.75 m radian
G: W≦3.75 m radian The same procedures as the above were repeated except that the amount of titanium oxide incorporated into an ethylene/tetracyclododecene was changed, information recording discs were produced.

The results obtained are shown in Table 1.

Further the same procedures as the above were repeated except that titanium oxide was replaced with silica ($SiO_2$), an information recording disc was produced.

Furthermore, the same procedures as the above were repeated except that an ethylene/tetraceclodocene (the ethylene content 72 mol %, and the softening temperature (TMA) 115° C.) was used, an information recording disc was produced.

For comparative purposes, the same procedures as above were repeated except that inner and outer peripheral spacers contained no inorganic particles were used. Further, the same procedures as above were repeated except that the outer and inner peripheral spacers contained 7.5% by weight of titanium oxide were used.

Results are also shown in Table 1. Incidentally, the ethylene-tetracyclododecene copolymer used for the spacers of these comparative runs had an ethylene content of 72 mol % and a softening temperature (TMA) of 115° C.

TABLE 1

Figure 4:
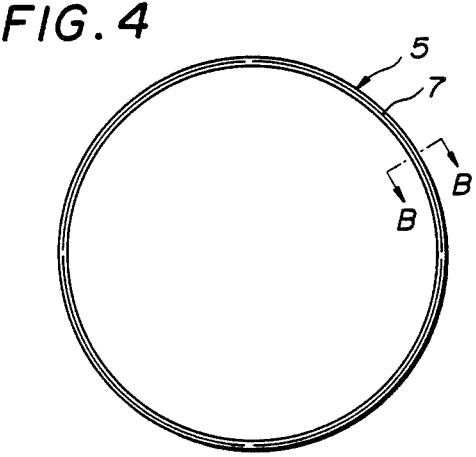
FIG. 4 is a plan view of another outer peripheral spacer.
Figure 5:
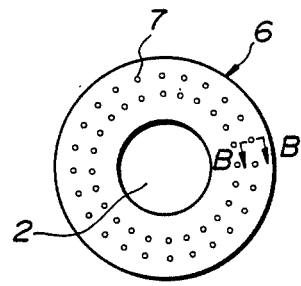
FIG. 5 is a plan view of an inner peripheral spacer.

|  | Inorganic Substance | | | | | |
|---|---|---|---|---|---|---|
|  | Kind | Particle size (μm) | Amount added (parts by wt.) | FIG. No. of outer peripheral | Time of ultrasonic vibration* | Amount of warp | Remarks |
| Example | | | | | | | |
| 1 | TiO₂ | 5 | 0.1 | FIG. 3 | 1.17 second | G | |
| 2 | TiO₂ | 5 | 0.2 | FIG. 4 | 1.15 second | G | |
| 3 | TiO₂ | 5 | 0.3 | FIG. 3 | 1.05 second | G | |
| 4 | TiO₂ | 2 | 1.0 | FIG. 3 | 1.01 second | G | |
| 5 | SiO₂ | 8 | 0.2 | FIG. 3 | 1.20 second | G | |
| Comp. Example | | | | | | | |
| 1 | — | — | — | FIG. 3 | 1.75 second | F | |
| 2 | TiO₂ | 5 | 7.5 | FIG. 3 | 1.02 second | F | Cracks in spacers |

*Total time of ultrasonic vibration required for provisional welding of the outer peripheral spacer and for complete welding of both the outer and inner peripheral spacers.

As revealed from Table 1 when compared with spacers made of the copolymer containing no inorganic particles, spacers made of the copolymer containing the specific amount of the inorganic particles can be welded to disc substrates to the same weld depth within a shortened period of ultrasonic vibration and can produce an information recording disc having a reduced warp angle.

In the process illustrated above, moreover, the positioning becomes easy and hence shear in positioning is inhibited at the time when ultrasonic welding is carried out, because the outer peripheral spacer 5 is welded to the disc substrate 3a in the first stage. Furthermore, since other unwelded parts are welded at once to one another under the condition where the outer peripheral spacer 5 has been welded to the disc substrate 3a on one side, residual strain lessens and the information recording disc 1 obtained thereby is found to be favorable from the standpoint of warp.

What is claimed is:

1. A resin composition for spacers of an information recording disc which comprises:

(A) a random copolymer of ethylene and at least one cycloolefin represented by the formula

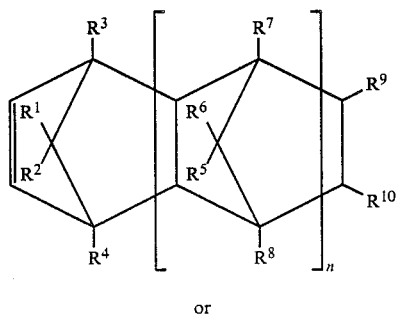

(I)

or

-continued

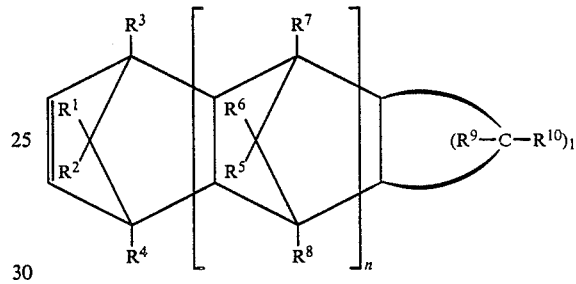

(II)

wherein n and m each represents 0 or a positive integer, 1 is an integer of at least 3, and R¹ to R¹⁰ independently represent a hydrogen atom, a halogen atom or a hydrocarbon group, and having an intrinsic viscosity [η] of from 0.05 to 10 dl/g, as measured in decalin at a temperature of 135° C., and (B) from 0.01 to 5 parts by weight, based on 100 parts by weight of said copolymer (A), of at least one inorganic material selected from the group consisting of titanium oxide and silica having a particle size of not more than 300 μm.

2. The resin composition according to claim 1 wherein the inorganic particle has a particle size of not more than 200 μm.

3. The resin composition according to claim 1 wherein the random copolymer comprises from 50 to 85 mole % first constituent unit derived from ethylene and from 15 to 50 mole % by mole of second constituent unit derived from at least on cycloolefin of the general formula [I] or [II] shown above, being soluble in decalin at a temperature of 135° C., and having an intrinsic viscosity [η] of from 0.05 to 10 dl/g as measured in decalin at a temperature of 135° C., softening temperature (TMA) of from 70° to 170°, as measured by means of a thermal mechanical analyzer, a glass transition temperature (Tg) of from 50° to 60°, and a crystallinity of not higher than 10% as determined by X-ray diffractometry.

* * * * *